US007006097B2

(12) United States Patent
Jang et al.

(10) Patent No.: US 7,006,097 B2
(45) Date of Patent: Feb. 28, 2006

(54) METHOD AND APPARATUS FOR COMPRESSION AND RECONSTRUCTION OF ANIMATION PATH USING LINEAR APPROXIMATION

(75) Inventors: Euee-seon Jang, Kyungki-do (KR); Do-kyoon Kim, Kyungki-do (KR); Sang-oak Woo, Seoul (KR)

(73) Assignee: Samsung Electronic Co., Ltd., Suwon (KR)

( * ) Notice: Subject to any disclaimer, the term of this patent is extended or adjusted under 35 U.S.C. 154(b) by 172 days.

(21) Appl. No.: 09/988,708

(22) Filed: Nov. 20, 2001

(65) Prior Publication Data

US 2002/0097246 A1 Jul. 25, 2002

(30) Foreign Application Priority Data

Nov. 23, 2000 (KR) ............................... 2000-70090
Jul. 7, 2001 (KR) ............................... 2001-40704

(51) Int. Cl.
*G06T 15/00* (2006.01)

(52) U.S. Cl. ...................... 345/474; 382/196; 382/232; 348/700

(58) Field of Classification Search ................ 345/474, 345/473, 475; 382/196–198, 232, 236; 348/700
See application file for complete search history.

(56) References Cited

U.S. PATENT DOCUMENTS 6,559,848 B1 * 5/2003 O'Rourke ................... 345/473
2002/0036639 A1 * 3/2002 Bourges-Sevenier ........ 345/474

FOREIGN PATENT DOCUMENTS

| | | | |
|---|---|---|---|
| CN | 1170909 | A | 1/1998 |
| CN | 1197250 | A | 10/1998 |
| EP | 0 789 327 | | 8/1997 |
| EP | 0 851 684 | A2 | 1/1998 |
| EP | 0 851 684 | | 7/1998 |
| GB | 2 296 839 | | 7/1996 |
| JP | 6162159 | | 6/1994 |
| JP | 8212386 | | 8/1996 |
| JP | 2000149039 | | 5/2000 |
| WO | WO 87/04032 | | 7/1987 |
| WO | 99/064944 | | 3/2000 |

OTHER PUBLICATIONS

A. K. Jain, "Fundamentals of digital Image Process", Chapter 9, pp. 342-431, published by Prentice Hall Englewood Cliffs, NJ, in 1989.

(Continued)

*Primary Examiner*—Phu K. Nguyen
(74) *Attorney, Agent, or Firm*—Buchanan Ingersoll PC

(57) ABSTRACT

Methods for compressing and reconstructing an animation path using linear approximation, apparatuses for performing the methods, and data formats therefor are provided. The apparatus for compressing an animation path, has an interpolator analysis unit for extracting a predetermined number of break points from an animation path and outputting keys and key values corresponding to the break points; a key coder for coding keys output from the interpolator analysis unit; a key value coder for coding key values output from the interpolator analysis unit; and an entropy encoder for entropy encoding the keys and key values which are coded in the key coder and key value coder, respectively, and outputting encoded bit streams. According to the methods, by analyzing break points, a simplified encoded bit stream having a minimum number of break points is obtained.

21 Claims, 19 Drawing Sheets

OTHER PUBLICATIONS

Euee S. Jang, "3D Animation Coding: its History and Framework", Proceedings of the International Conference of Multimedia and Expo held in New York city in 2000.

Bourges-Sevenier, M. et al., *Animation framework for MPEG-4 systems*, 2000 IEEE International Conference on New York, NY, Jul. 2000, pp. 1115-1118.

* cited by examiner

```
ScalarInterpolator {
  eventin SFFloat set_fraction
  exposedField MFFloat key [ ]
  exposedField MFFloat keyValue [ ]
  eventout SFFloat value_changed
}
```

FIG. 12

| CompressedPositionInterpolator () | No. of bits | Mnemonic |
|---|---|---|
| { | | |
| decodeAAC_start(); | | |
| n_key | 16 | uimsbf |
| k_res | 16 | uimsbf |
| kv_res | 16 | uimsbf |
| min_x | 16 | uimsbf |
| max_x | 16 | uimsbf |
| min_y | 16 | uimsbf |
| max_y | 16 | uimsbf |
| min_z | 16 | uimsbf |
| max_z | 16 | uimsbf |
| for (i=0; i<n_key; i++) | | |
| { | | |
| decodeAAC(key_flag[i], Key_flag_Context); | | vlclbf |
| } | | |
| for (i=0; i<n_key; i++) | | |
| { | | |
| decodeAAC(key[i], Key_Context); | | vlclbf |
| } | | |
| decipher_key_flag(key_flag); | | |
| for (i=0; i<n_kv_x; i++) | | |
| { | | |
| decodeAAC(kv[i], Kv_Context); | | vlclbf |
| Inv_Quantize(kv[i]); | | |
| } | | |
| for (i=0; i<n_kv_y; i++) | | |
| { | | |
| decodeAAC(kv[i], Kv_Context); | | vlclbf |
| Inv_Quantize(kv[i]); | | |
| } | | |
| for (i=0; i<n_kv_z; i++) | | |
| { | | |
| decodeAAC(kv[i], Kv_Context); | | vlclbf |
| Inv_Quantize(kv[i]); | | |
| } | | |
| decodeAAC_finish( ); | | |
| } | | |

METHOD AND APPARATUS FOR COMPRESSION AND RECONSTRUCTION OF ANIMATION PATH USING LINEAR APPROXIMATION

Priority is claimed to Patent Application Numbers 2000-70090, filed in the Republic of Korea on Nov. 23, 2000 and 2001-40704 filed in Republic of Korea on Jul. 7, 2001, herein incorporated by reference.

BACKGROUND OF THE INVENTION

1. Field of the Invention

The present invention relates to animation of 3-Dimensional (3D) graphics models, and more particularly, to apparatuses for compression and reconstruction of an animation path, which is used in animation, using linear approximation, methods of compression and reconstruction used in the apparatuses, and data formats for the apparatuses and methods.

2. Description of the Related Art

In 3D computer animation, interpolators are used to express motion and rotation in a space, model morphing, color changes, etc. of a 3D model object.

FIG. 1 is a diagram for explaining an animation path in ordinary 3D animation, and the vertical axis represents key values (KEY_VALUE) and the horizontal axis represents keys (KEY).

As shown in FIG. 1, the animation path 20 expresses the animation trace of a 3D model 10. The path 20 of animation information is a 2-dimensional curve varying with respect to time, as shown in FIG. 1. The animation path may be represented by a variety of methods, which are explained in Chapter 9 of A. K. Jain, "Fundamentals of Digital Image Processing", published by Prentice Hall in 1989.

In an expression using an interpolator, the animation path 20 having a curve shape, as shown in FIG. 1, can be represented by definite straight lines using a plurality of segments. Essential information in this expression includes break points or vertices of each definite straight line segment. Here, the break points or vertices are expressed as points on the animation path 20 of FIG. 1. Using linear interpolation, the original curve can be reconstructed from the break points.

FIG. 2 is an example of an expression (Scalar Interpolator) of an animation path used in the Virtual Reality Modeling Language (VRML) or MPEG-4. Information to be processed includes keys and key values, and linear interpolation is performed using given information.

Interpolators can be roughly divided into 6 kinds: scalar interpolators, position interpolators, coordinate interpolators, orientation interpolators, normal interpolators, and color interpolators. Among them, scalar interpolators can be expressed as shown in FIG. 2. The characteristics and functions of the 6 kinds of interpolators are shown in the following table 1, and all the interpolators are sets of given keys and key values corresponding to the keys.

TABLE 1

| Kinds | Characteristics | Functions |
|---|---|---|
| Scalar Interpolator | Linear interpolation of scalar change amount | Expression of width, radius, solidity, etc. |
| Position Interpolator | Liner interpolation on 3D coordinates | Parallel movement in a 3D space |
| Orientation Interpolator | Spherical Linear interpolation of 3D axes and rotation amount | Rotation in a 3D space |
| Coordinate Interpolator | Liner interpolation of 3D model coordinate change amount | 3D morphing |
| Normal Interpolator | Spherical Linear interpolation of 3D normal coordinates | Expression of 3D normal vector change |
| Color Interpolator | Linear interpolation of color tone information | Expression of color tone change amount |

FIG. 3 is a schematic diagram for explaining a 3D animation data format, and shows an encoder 30, a decoder 40, and a 3D animation file format 50. Here, the 3D animation file format 50 output from the encoder 30 to the decoder 40 is formed with model data, animation data, attributes, video/texture, and sound.

Referring to FIG. 3, an interpolator corresponds to animation data which efficiently expresses a 3D animation path. 3D animation data expressed by the VRML or MPEG-4 is formed with information shown in FIG. 3. While standardized compression technologies are provided for audio, video, and 3D models, only expression-oriented general-purpose compression technologies are provided for interpolator for determining an animation path. In animation excluding audio/video, the amount of data for animation paths together with 3D models take most of the needed amount of data.

Therefore, together with technology for compression of 3D models, technology for compression of animation paths is essential. Though the MPEG-4 Binary Format for Scene (BIFS) provides a basic quantization/compression method for animation, the method is not a technology dedicated for interpolators but a general-purpose compression technology and has poor compression performance. This is disclosed in Euee S. Jang "3D Animation Coding: its History and Framework", proceedings of the International Conference on multimedia and Expo held in New York city in 2000.

FIGS. 4*a* and 4*b* are block diagrams of prior art animation path compression and reconstruction apparatuses, respectively. The prior art compression apparatus of FIG. 4*a* is formed with a scalar quantization unit 60, and the prior art reconstruction apparatus of FIG. 4*b* is formed with a scalar dequantization unit 70. An original animation path is input in the form of (key, key_value) through an input terminal IN1 to the scalar quantization unit 60 of FIG. 4*a* and is scalar quantized. An encoded bit stream which is the result of scalar quantization is output through an output terminal OUT1. The scalar dequantization unit 70 of FIG. 4*b* receives the encoded bit stream through an input terminal IN2 and outputs data in the form of a reconstructed animation path (key, key_value) through an output terminal OUT2.

The interpolator compression in the prior art MPEG-4 BIFS needs scalar quantization as shown in FIG. 4*a*. The prior art compression process of FIG. 4*a* is applied not only to interpolators but to all elements that need compression in the BIFS. In the inverse of the compression order, an animation path is reconstructed through the scalar dequantization unit 70, using the encoded bit stream input to the prior art reconstruction apparatus of FIG. 4*b*. In the apparatuses of FIGS. 4*a* and 4*b*, keys and key values of interpolators are compressed in a uniform way, without considering the characteristics of each kind, so compression cannot be maximized.

SUMMARY OF THE INVENTION

To solve the above problems, it is a first objective of the present invention to provide an apparatus and method for compressing an animation path using linear approximation, in which animation data in the form of an interpolator is efficiently compressed so that transmitting and storing data is quickly performed, It is a second objective of the present invention to provide an animation path reconstructing apparatus and method for effectively reconstructing compressed animation path data.

It is a third objective of the present invention to provide a data format for compression of animation path data.

To accomplish the first objective of the present invention, there is provided an apparatus for compressing an animation path, having an interpolator analysis unit for extracting a predetermined number of break points from an animation path and outputting keys and key values corresponding to the break points; a key coder for coding keys output from the interpolator analysis unit; a key value coder for coding key values output from the interpolator analysis unit; and an entropy encoder for entropy encoding the keys and key values which are coded in the key coder and key value coder, respectively, and outputting encoded bit streams.

To accomplish the second objective of the present invention, there is provided an apparatus for reconstructing an animation path, having an entropy decoder for receiving an encoded bit stream and entropy decoding the bit stream; a key decoder for receiving the entropy decoded result and decoding keys; a key value decoder for receiving the entropy decoded result and decoding key values; and an interpolator reconstruction unit for obtaining empty key values by linear interpolation based on the keys and key values decoded in the key decoder and the key value decoder, respectively, and reconstructing the original animation path.

Also, to accomplish the first objective of the present invention, there is provided a method for compressing an animation path having the steps of extracting a predetermined number of break points from an original animation path; extracting keys and key values using the extracted break points, and coding the keys and key values; and entropy encoding the coded keys and key values to obtain encoded bit streams.

Also to accomplish the second objective of the present invention, there is provided a method for extracting break points of an animation path having the steps of (a) selecting two break points on both end points of the original animation path, among break points on the animation path; (b) selecting one break point among the remaining break points excluding the two selected break points; (c) interpolating for key values of the remaining break points excluding the selected break points, using the selected break points; (d) forming an approximated path based on the selected break points and the interpolated key values, selecting an approximated animation path which has the smallest path difference between the original animation path and the approximated animation path, and selecting break points corresponding to the selected animation path; and (e) selecting one break points among remaining break points excluding the break points selected in steps (a) and (b), and repeating steps (c) to (e) until the path difference is less than an allowable difference.

It is preferable that the path difference is expressed by the sum of areas of trapezoids or twisted trapezoids which are formed by the original animation path and the approximated animation path.

It is preferable that in an orientation interpolator, the path difference is defined as a differential rotation angle in a differential rotation transformation, which is the difference between a rotation transformation of the original animation path and a rotation transformation of the approximated path.

Also, to accomplish the second objective of the present invention, there is provided a method for reconstructing an animation path having the steps of receiving and entropy decoding an encoded bit stream; decoding keys and key values from the result of entropy decoding; and reconstructing an original animation path by obtaining empty key values by linear interpolation based on the decoded keys and key values.

To accomplish the third objective of the present invention, there is provided a data format of a bit stream which is obtained by encoding an animation path, the data format having a key flag for indicating key values of which axes are selected among key values corresponding to an x, y, or z coordinate of each break point of the animation path; an array-type key for indicating that at least one or more key values are selected among key values corresponding to an x, y, or z coordinate of each break point; and array-type key values for indicating key values selected for each break point.

BRIEF DESCRIPTION OF THE DRAWINGS

The above objects and advantages of the present invention will become more apparent by describing in detail preferred embodiments thereof with reference to the attached drawings in which:

FIG. 12 is a table for explaining a decoding process expressed in a syntax expression according to the present invention;

DESCRIPTION OF THE PREFERRED EMBODIMENTS

In the following description of the present invention, the interpolator expressions used are those used in the VRML/MPEG-4, and the fields in which the interpolators are used include online computer games, animation advertisements, etc.

Figure 5A:
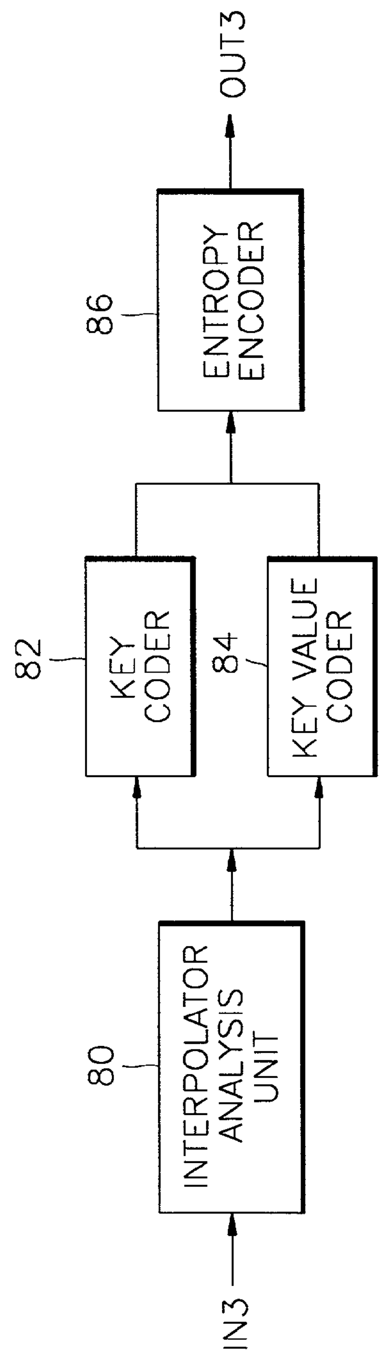
FIGS. 5*a* and 5*b* are block diagrams of animation path compression and reconstruction apparatuses according to the present invention, respectively.
Figure 5B:
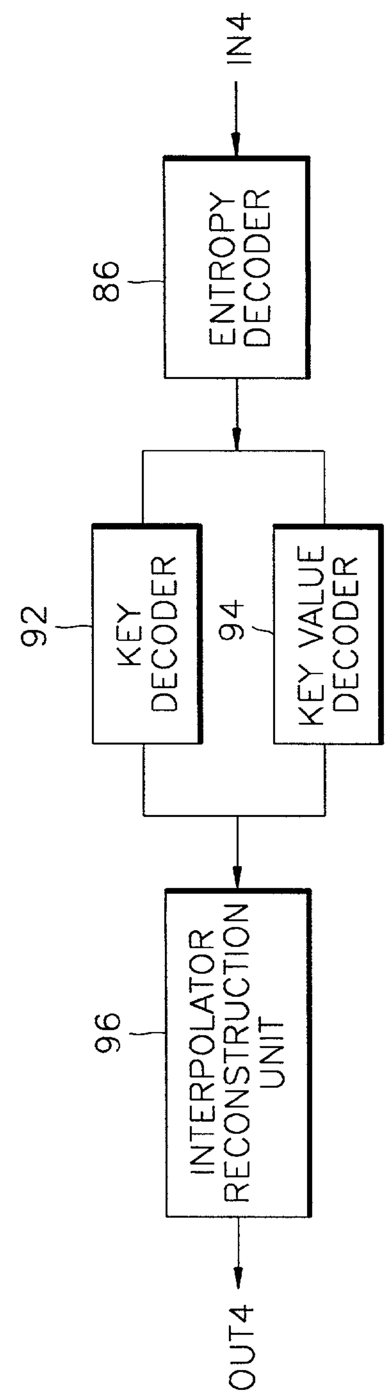

FIG. 5*a* is a block diagram of an apparatus for compressing an animation path according to the present invention, the apparatus including an interpolator analysis unit 80, a Key (K) coder 82, a Key Value (KV) coder 84, and an entropy encoder 86. FIG. 5*b* is a block diagram of an apparatus for reconstructing an animation path according to the present invention, the apparatus including of an entropy decoder 90, a key decoder 92, a key value decoder 94, and an interpolator reconstruction unit 96.

The interpolator analysis unit 80 of the compression apparatus of FIG. 5*a* selects keys and key values to be encoded, and may be designed in consideration of the characteristics of different types of interpolators. An example of detailed analysis will be explained later.

Figure 6:
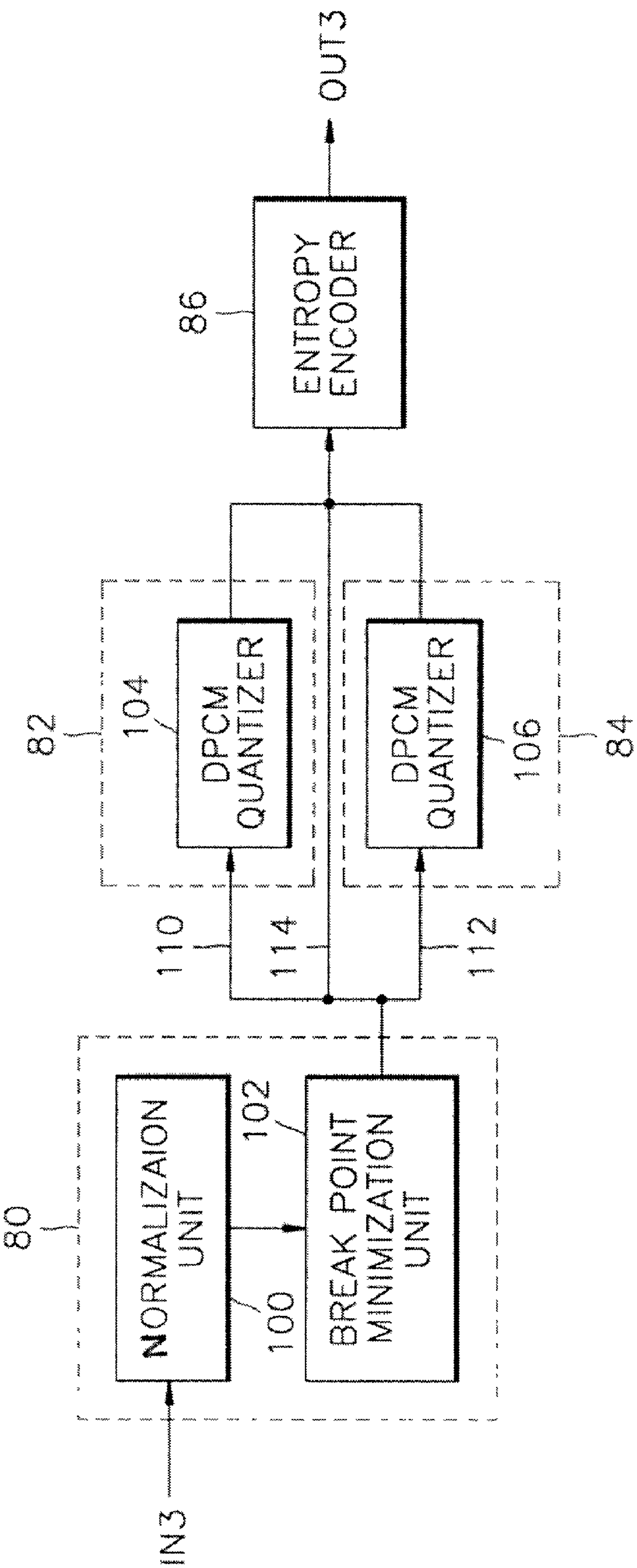
FIG. 6 is a block diagram of a preferred embodiment of the compression apparatus according to the present invention of FIG. 5*a;*

FIG. 6 is a block diagram of a preferred embodiment of the compression apparatus according to the present invention of FIG. 5*a*. The compression apparatus of FIG. 6 includes the interpolator analysis unit 80 having a normalization unit 100 and a break point minimization unit 102, the key coder 82 having a Differential Pulse Code Modulation (DPCM) quantizer 104, the key value coder 84 having a DPCM quantization unit 106, and the entropy encoder 86.

Figure 7:
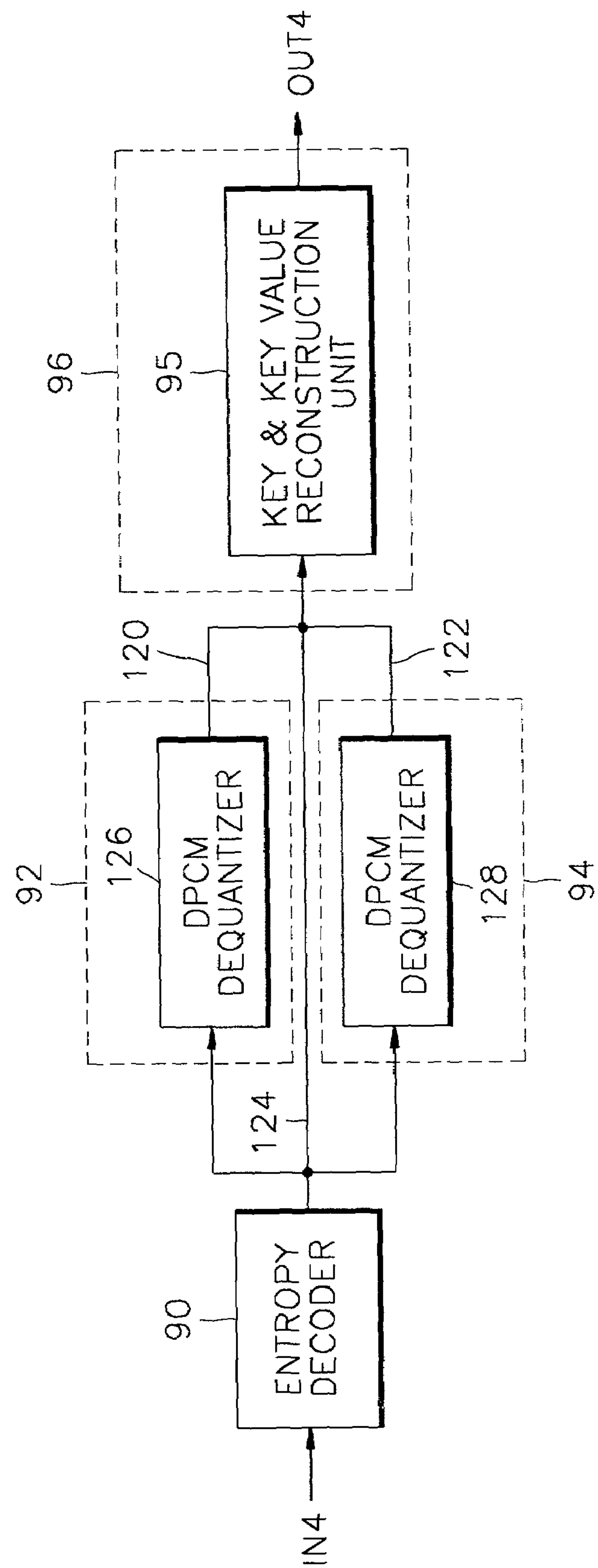
FIG. 7 is a block diagram of a preferred embodiment of the reconstruction apparatus according to the present invention of FIG. 5*b;*

FIG. 7 is a block diagram of a preferred embodiment of the reconstruction apparatus according to the present invention of FIG. 5*b*. The reconstruction apparatus includes the entropy decoder 90, the key decoder 92 having a DPCM dequantizer 126, the key value decoder 94 having a DPCM dequantizer 128, and the interpolator reconstruction unit having a key & key value reconstruction unit 95.

Interpolator expression provided to the input of the interpolator analysis unit 80 includes keys (K) and key values (KV). In the compression apparatus of FIG. 6, the interpolator analysis unit 80 adjusts the number of break points so that an animation path, which is input through an input terminal IN3, can be expressed by a minimum number of break points. If the original number of break points of the animation path is N, the number of break points output from the interpolator analysis unit 80 is adjusted to M (M≦N). That is, the interpolator analysis unit 80 extracts break points from the original animation path input to the input terminal IN3.

In an interpolator, a key and key values can be respectively normalized and used. For this, the normalization unit 100 normalizes each of the key and key values in the original animation path which is input through the input terminal IN3, and outputs normalized results to the break point minimization unit 102. A key supported by the VRML has a value between 0 and 1 inclusive.

The way the interpolator analysis unit 80 adjusts the number of break points may be determined so that the difference of the animation path generated by the adjusted break points and the original animation path is minimized. For this, the break point minimization unit 102 makes break points extracted from the normalized key and key values, which are output from the normalization unit 102, so that the number of the extracted break points is minimized. For example, for a position interpolator, the break point minimization unit 102 determines break points so that the area representing error between the real path and the quantized path, which is determined by the interpolator analysis unit 80, is minimized.

Meanwhile, extraction of break points using linear approximation performed in the break point minimization unit 102 of FIG. 6 will now be explained.

Figure 8A:
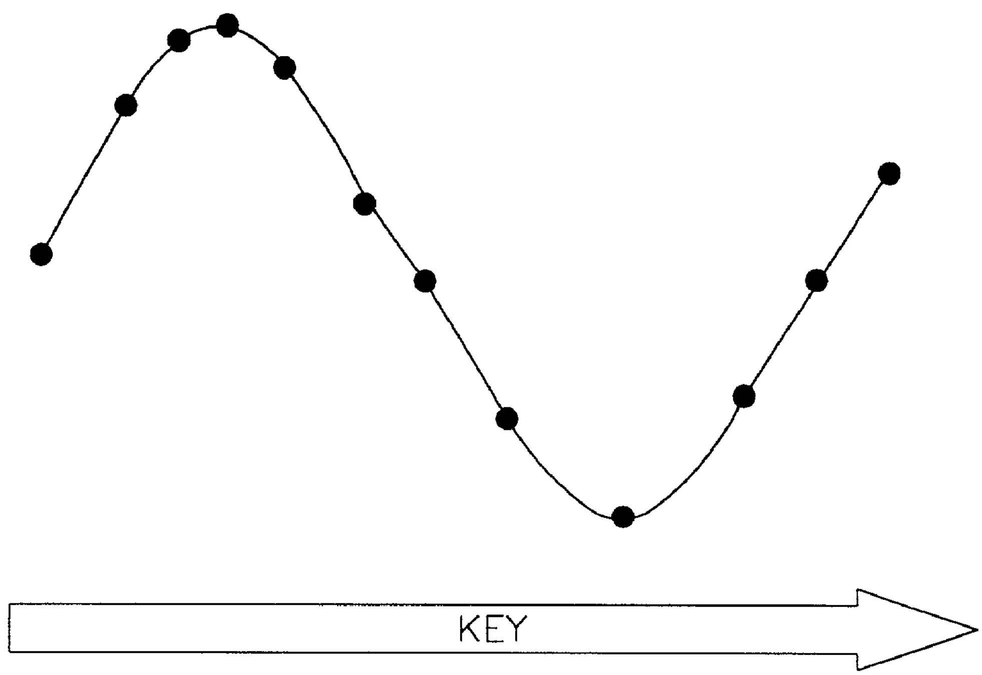
FIGS. 8*a* through 8*h* are diagrams for explaining a preferred embodiment of extracting break points using linear approximation according to the present invention.
Figure 8B:
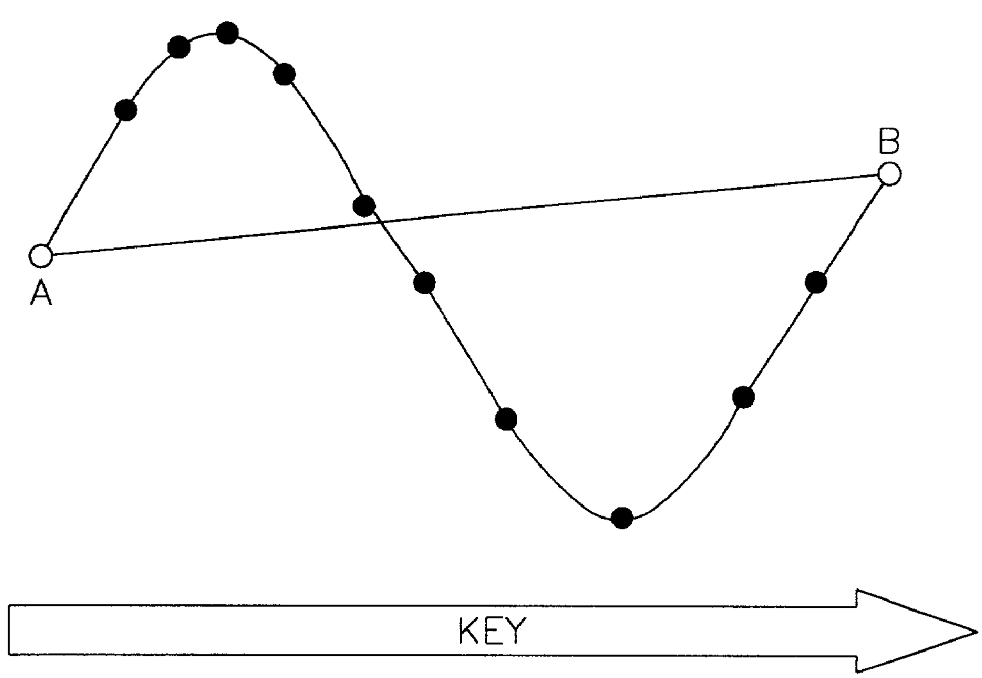
Figure 8C:
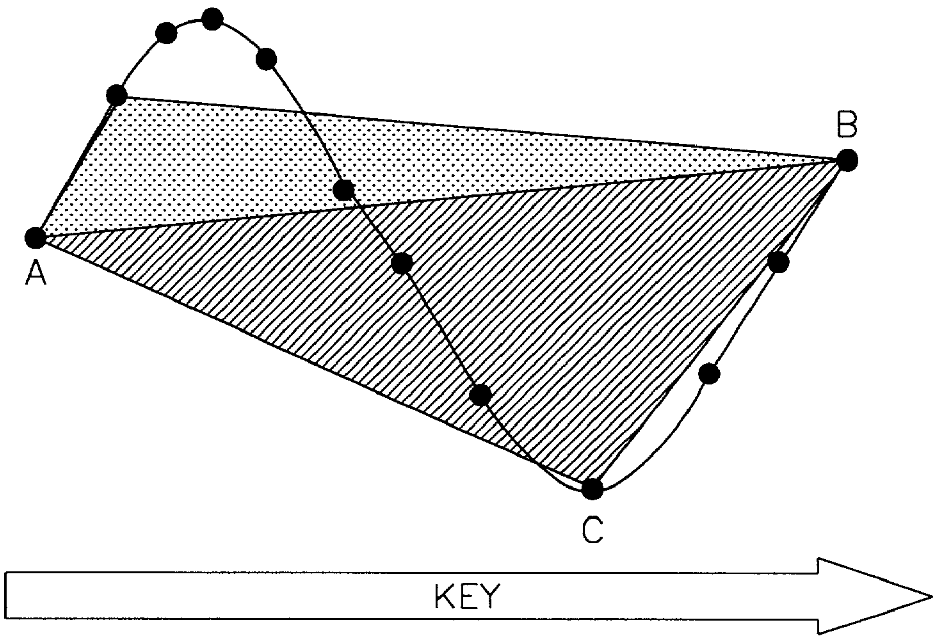
Figure 8D:
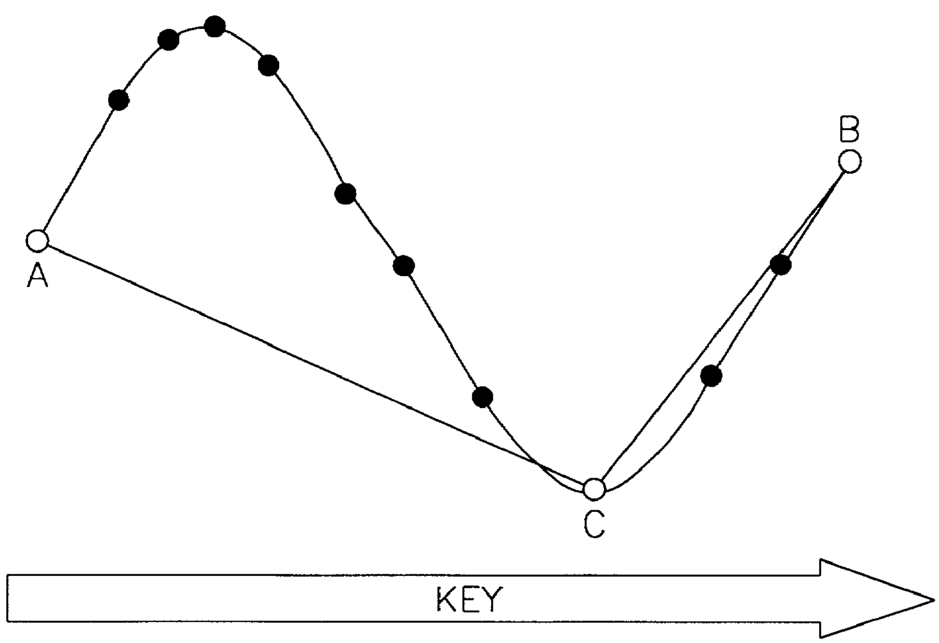
Figure 8E:
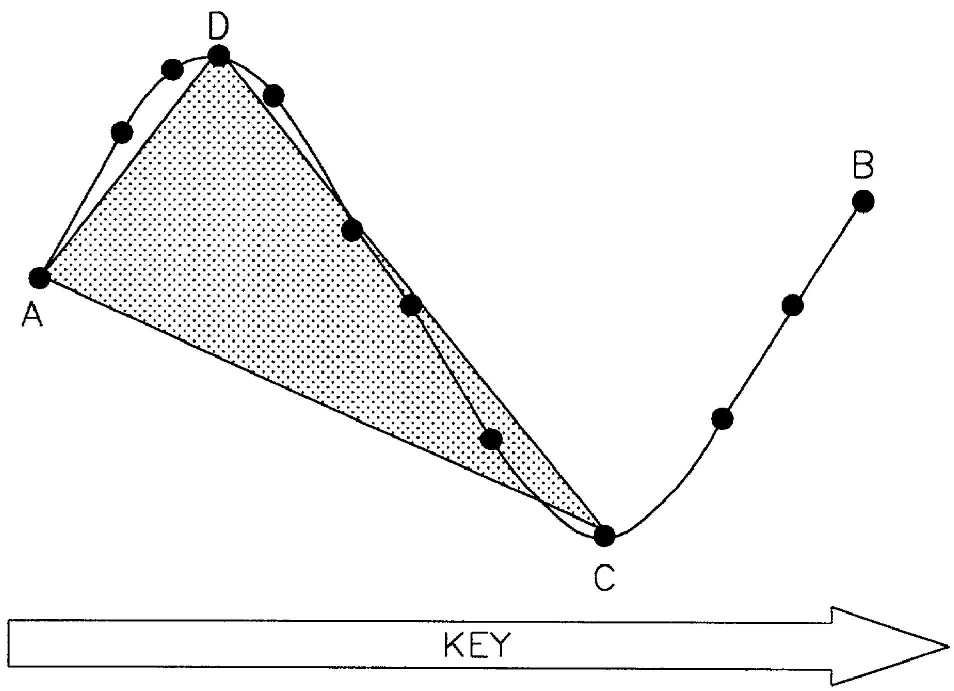
Figure 8F:
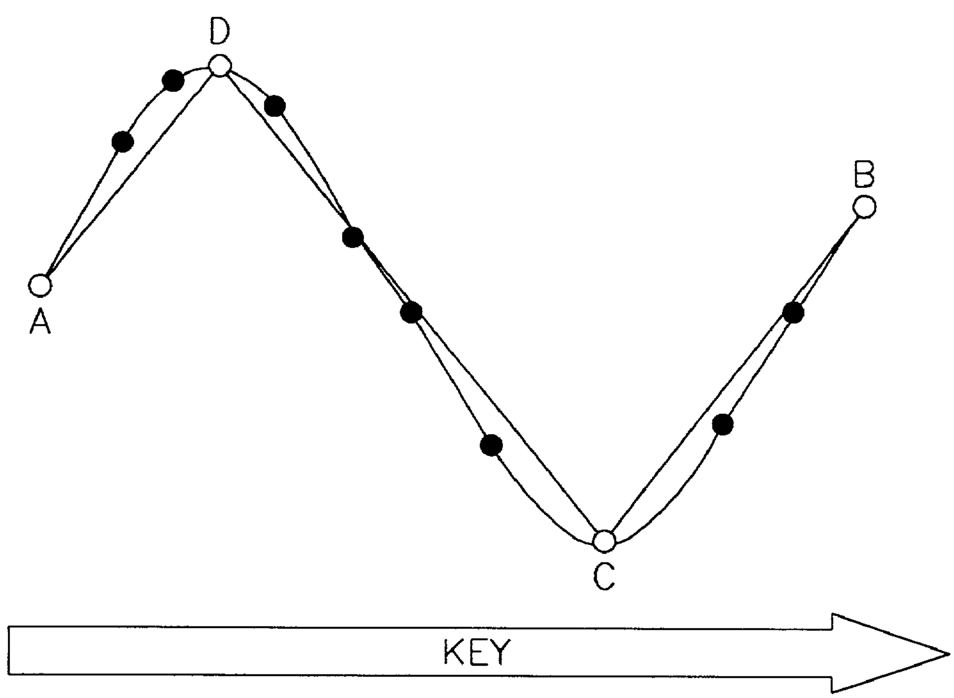
Figure 8G:
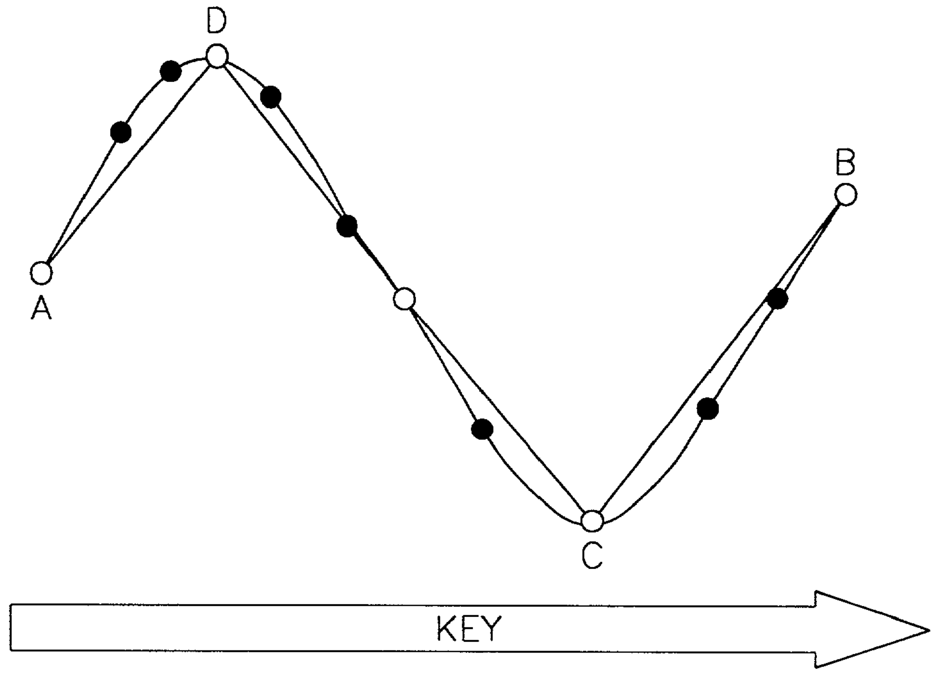
Figure 8H:
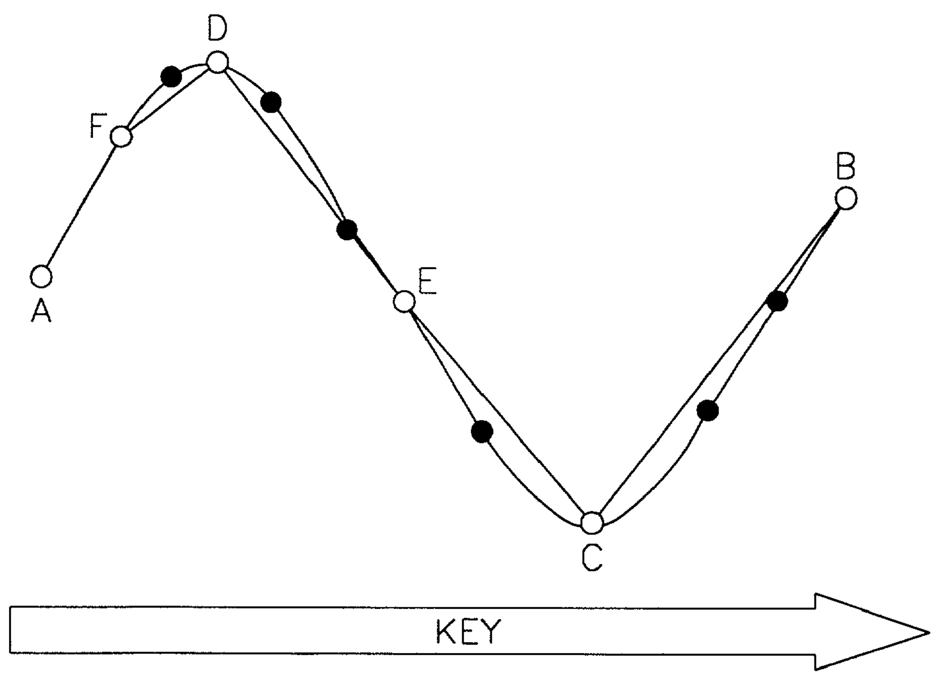

FIGS. 8*a* through 8*h* are diagrams for explaining a preferred embodiment of extracting break points using linear approximation according to the present invention. Each dot on the animation paths represents a break point. FIG. 8*a* is the original animation path. FIG. 8*b* shows a process for finding both end points (A, B) of the path. FIG. 8*c* shows a process for selecting a break point which is the closest to the original path. FIG. 8*d* shows break points, A, B, and C, which are selected first. FIG. 8*e* shows a process for extracting the second break points that are close to the original path. FIG. 8*f* shows break points, A, B, C, and D, which are selected second. FIG. 8*g* shows break points, A, B, C, D, and E, which are selected third. FIG. 8*h* shows break points, A, B, C, D, E, and F, which are selected fourth.

When the original animation path is given as in FIG. 8*a*, a process for finding break points (M break points, 2≦M≦N) representing an approximation path which has the smallest difference from the original path, among break points (N) on the original animation path, taking both end points A and B as starting points, is repeated. This process is shown in FIGS. 8*b* through 8*h*. At this time, extraction of break points may be repeated until it is determined that the approximation path is close enough to the original path.

Referring to the attached drawings, a method using an area difference will now be explained as a method for obtaining the difference between an approximation path and the real path.

Figure 9:
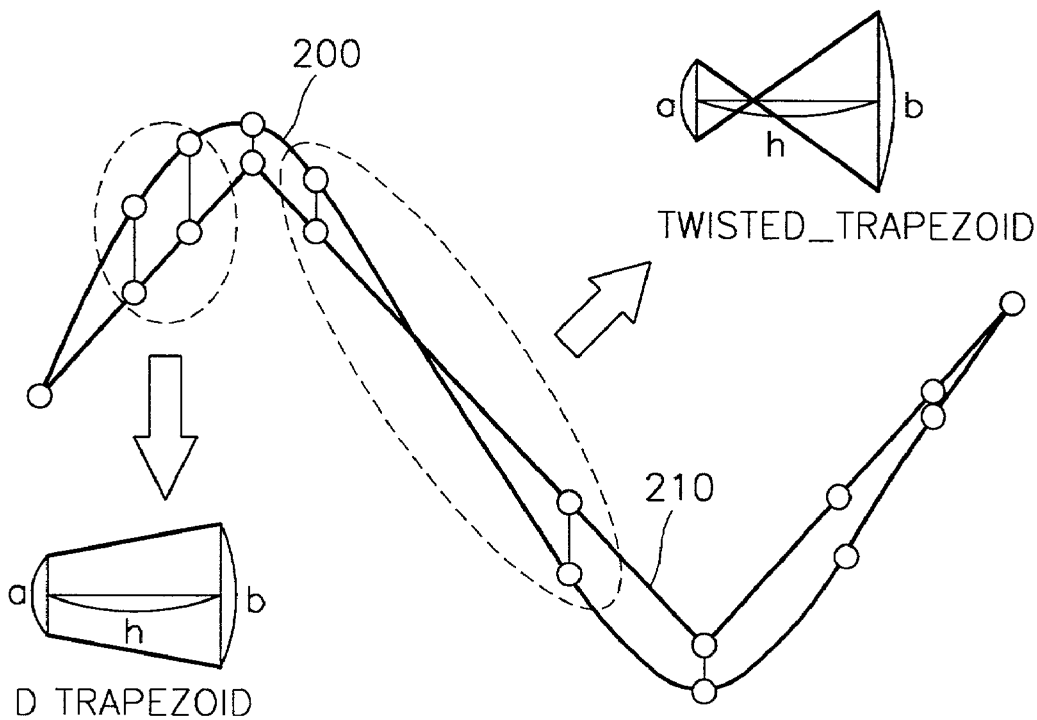
FIG. 9 is a diagram for explaining a method for obtaining the difference between a real animation path and an approximated animation path.

FIG. 9 is a diagram for explaining a method for obtaining the difference between a real animation path and an approximated animation path. Referring to FIG. 9, the difference between the two paths is expressed by a trapezoid or a twisted trapezoid. Equation 1 for obtaining the area of the trapezoid, and equation 2 for obtaining the area of the twisted trapezoid are provided below. The difference between the real animation path 200 and the approximated animation path 210 can be expressed by the sum of the area of the trapezoids and the area of the twisted trapezoids. The sum of the areas is the area difference ($D_A$) between the two paths as shown in equation 3.

$$D_{trapezoid} = \frac{(a+b)h}{2} \quad (1)$$

$$D_{\text{twisted\_trapezoid}} = \frac{1}{2}\frac{(a^2+b^2)}{(a+b)} \cdot h \quad (2)$$

-continued $$D_A = \sum_i D_{trapezoid} + \sum_j D_{twisted\_trapezoid} \quad (3)$$

Break points are extracted so that the area difference ($D_A$) of equation 3 is minimized. Thus, the break point minimization unit 102 extracts break points. By passing through the interpolator analysis unit 80, essential break points of the animation path are extracted. When lossless processing is needed, the number of extracted break points (M) may be the same as the number of the original break points.

In a position interpolator, key values represent a position in a 3D space having X, Y, and Z axes, and an animation path is represented by three curves on X, Y and Z axes. The interpolator analysis unit 80 may extract break points on each axis, and at this time, break points at each axis may be different from those of other axes. The following table 2 shows the result of extracting new break points in the interpolator analysis unit 80 from a real path having 8 break points (P0, P1, P2, P3, P4, P5, P6, and P7).

TABLE 2

| Break Points | P0 | P1 | P2 | P3 | P4 | P5 | P6 | P7 |
|---|---|---|---|---|---|---|---|---|
| $kv_x$ | ○ | X | X | X | ○ | X | X | ○ |
| $kv_y$ | ○ | X | ○ | X | ○ | X | X | ○ |
| $kv_z$ | ○ | X | ○ | X | X | ○ | X | ○ |
| key | ○ | X | ○ | X | ○ | ○ | X | ○ |
| key_flag | 7 | — | 6 | — | 3 | 4 | — | 7 |

In table 2, key_flag denotes a key flag, and $kv_x$, $kv_y$, and $kv_z$ denote key values on X, Y and Z axes, respectively. 'O' indicates that a key value corresponding to an x, y, or z coordinate of each break point is selected. For example, key value $kv_x$ is selected for break point P0. 'X' indicates that a key value corresponding to an axis on each break point is not selected. The key flag indicates the key values whose axes are selected among key values of X, Y, Z axes on each break point. For example, '7' indicates that all key values of all axes are selected, and '6' indicates that all key values, excluding the key value of the X axis, $kv_x$, are selected.

As shown in table 2, break points P1, P3, and P6 are regarded as unnecessary break points (marked by '–' in the key_flag space) because none of the key values of X, Y. and Z axes are selected on the break points. P0 and P7 are break points at both ends of the path, and key values of all axes are selected. At P2, the key value of the X axis is not selected, but key values on other axes are selected. Therefore, the interpolator analysis unit 80 determines keys corresponding to 5 break points, instead of the original 8 break points, and determines key values of each axis corresponding to selected break points. In table 2, 5 keys and 11 key values are needed. The corresponding relation between a key and key values may be represented by a key flag (key_flag), which is additionally transmitted. Thus, the number of keys and key values decreases from 32 of the real path (4×8=32) down to 16 keys and key values plus one additional key flag. Therefore, simplification in expression is achieved through the process.

FIGS. 14*a* through 14*f* are diagrams for explaining another preferred embodiment of extracting break points using spherical linear approximation according to the present invention. This shows a method for reducing break points (also referred to as key frames) in an orientation interpolator.

Figure 14A:
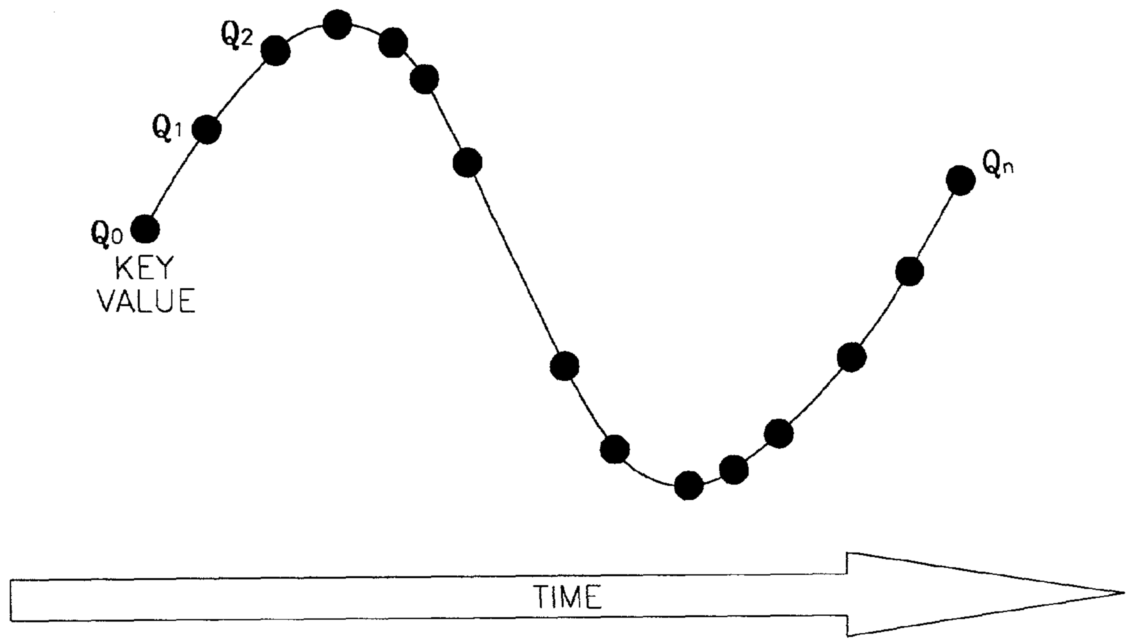
FIGS. 14*a* through 14*f* are diagrams for explaining another preferred embodiment of extracting break points using spherical linear approximation according to the present invention.
Figure 14B:
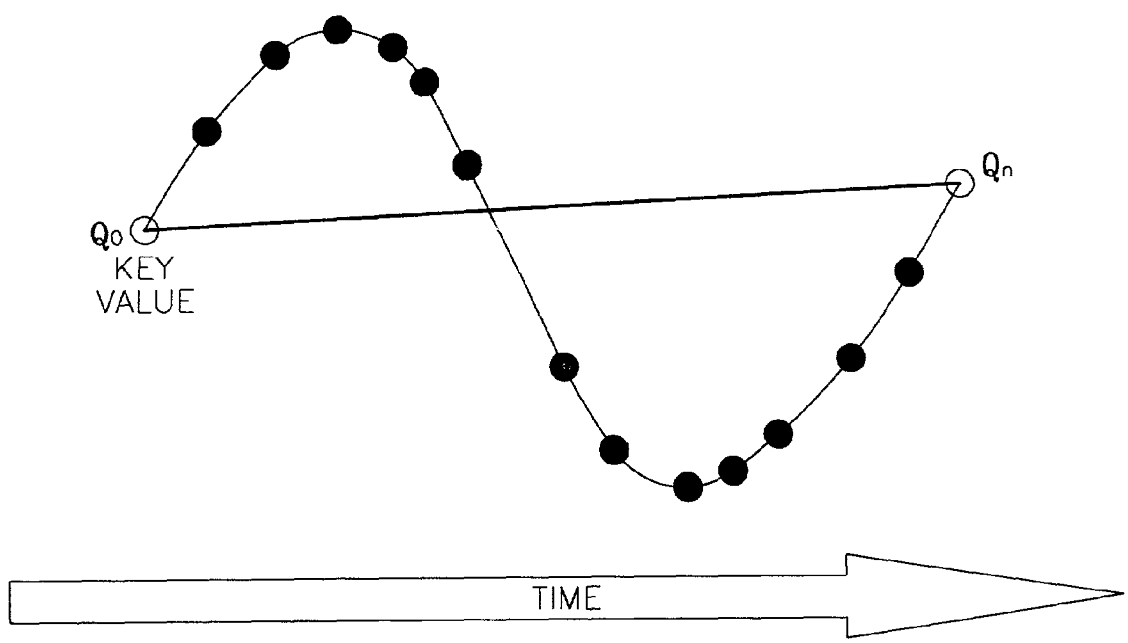

FIG. 14*a* shows key values ($=Q_0, Q_1, Q_2, \ldots, Q_n$) on each break point with respect to n+1 time points on the original animation path, and the key values are marked by black points. As shown in FIG. 14*b*, two break points ($=Q_0, Q_n$) corresponding to two ends of the animation path are first selected. The selected points are shown as white points.

Figures 1, 2:
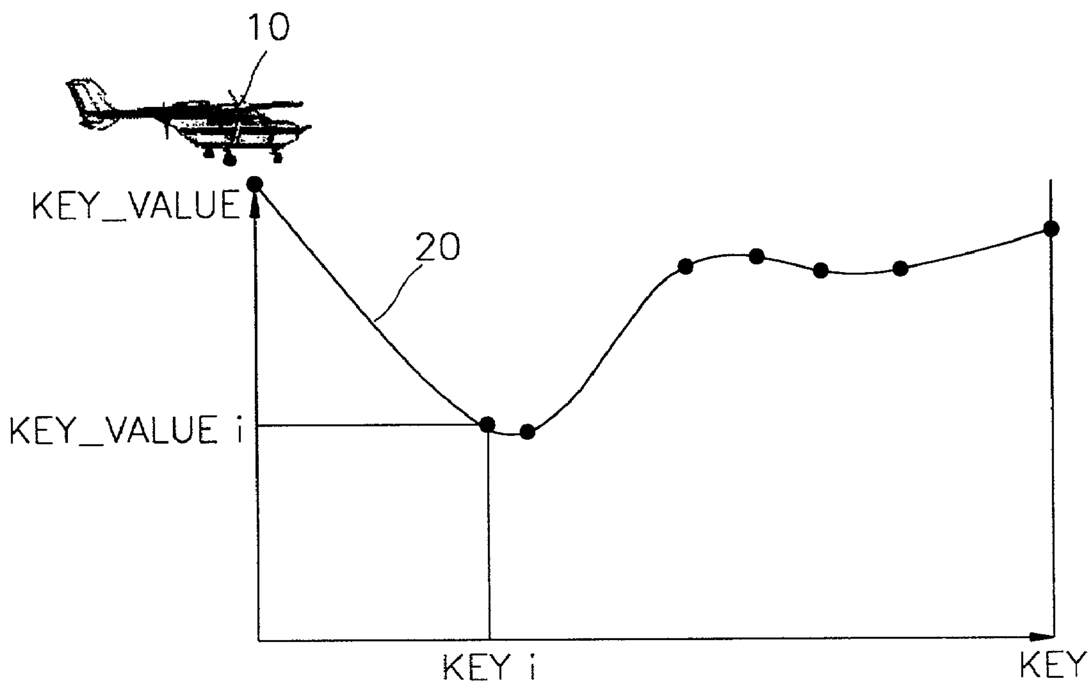
FIG. 1 is a diagram for explaining an animation path in ordinary 3-Dimensional (3D) animation.
FIG. 2 is an example of an expression of an animation path used in the Virtual Reality Modeling Language (VRML) or MPEG-4.
Figure 3:
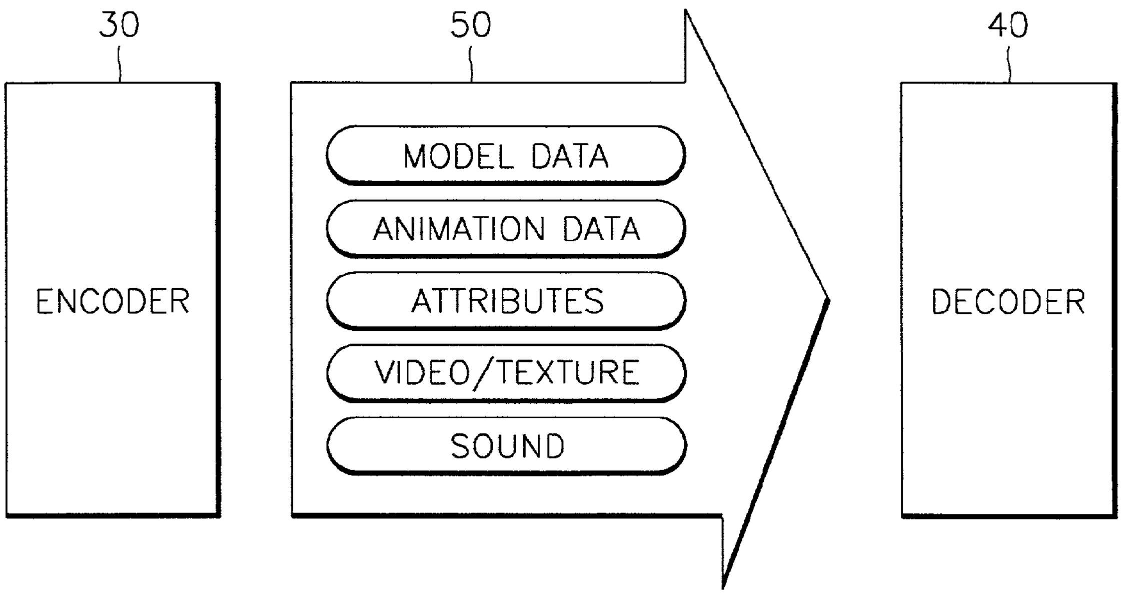
FIG. 3 is a schematic diagram for explaining a data format of 3D animation.
Figure 4A:
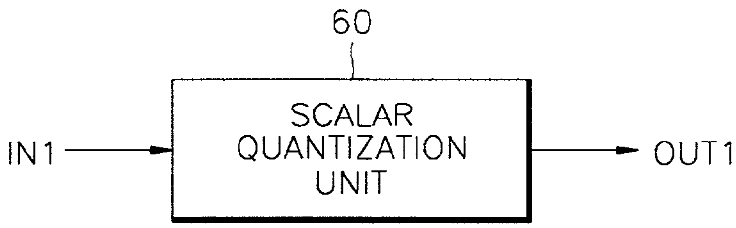
FIGS. 4*a* and 4*b* are block diagrams of prior art animation path compression and reconstruction apparatuses, respectively.
Figure 4B:
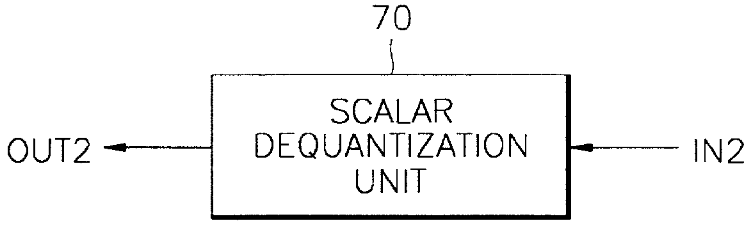
Figure 14C:
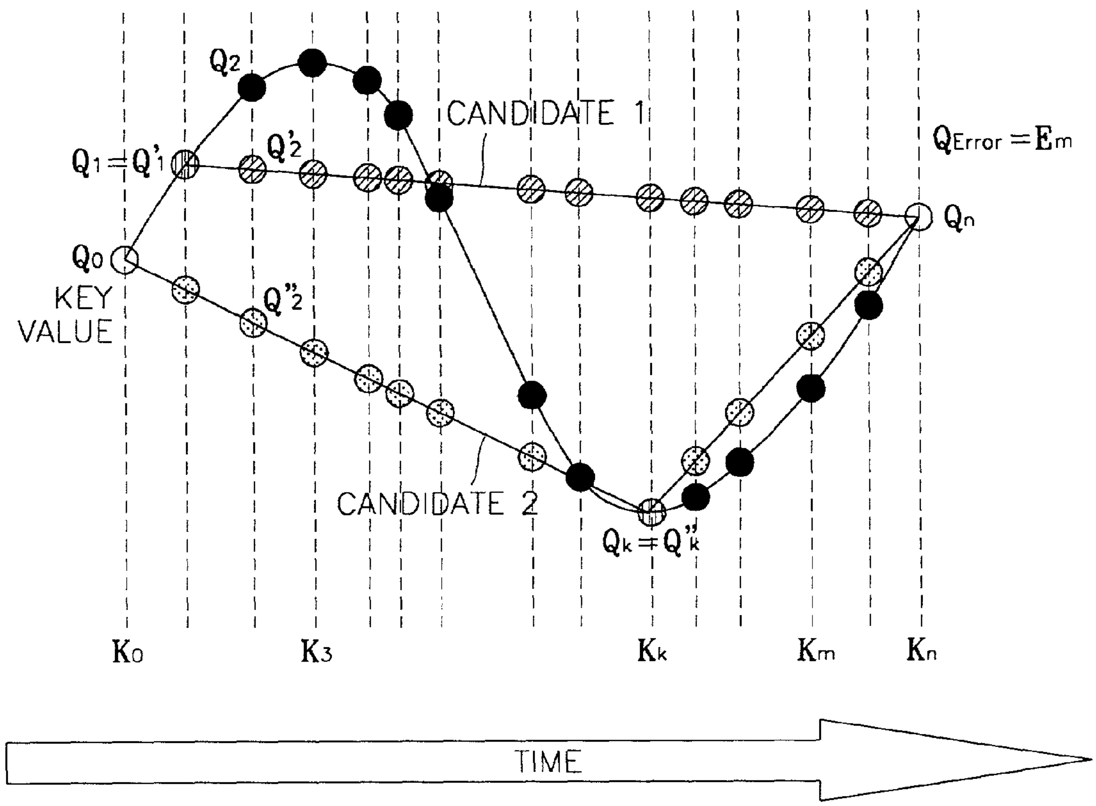
Figure 14D:
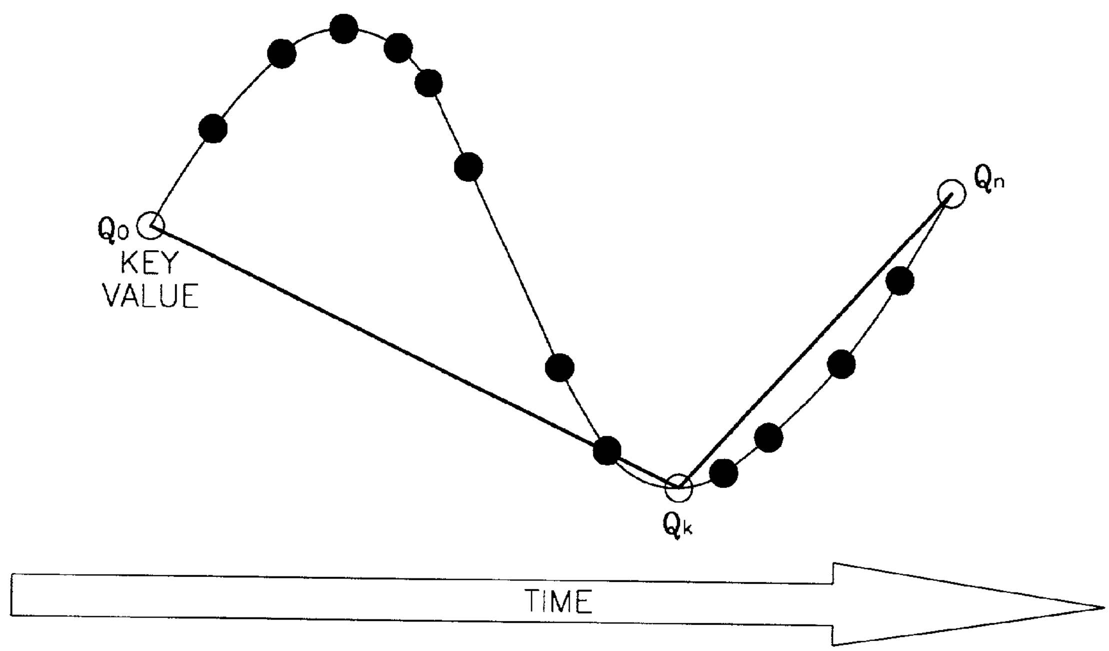

FIG. 14*c* shows a process for selecting a break point (the third break point) among the remaining break points excluding the two selected end break points. At this time, the number of methods for selecting one break point is (n−1). FIG. 14*c* shows an example in which two candidates ($=Q_1, Q_k$) are selected. For each of the (n−1) candidates, using the three selected break points, spherical linear interpolation is performed for key values of break points which are not selected. By comparing the original animation path and each of the (n−1) candidate animation paths obtained by interpolation, a candidate animation path which has the least path difference is selected. A break point corresponding to the selected candidate animation path is selected among the (n−1) candidate break points. As an example, FIG. 14*d* shows that the path of candidate 2 of FIG. 1 is selected. The error between paths is obtained by using average error $E_m$.

Figure 14E:
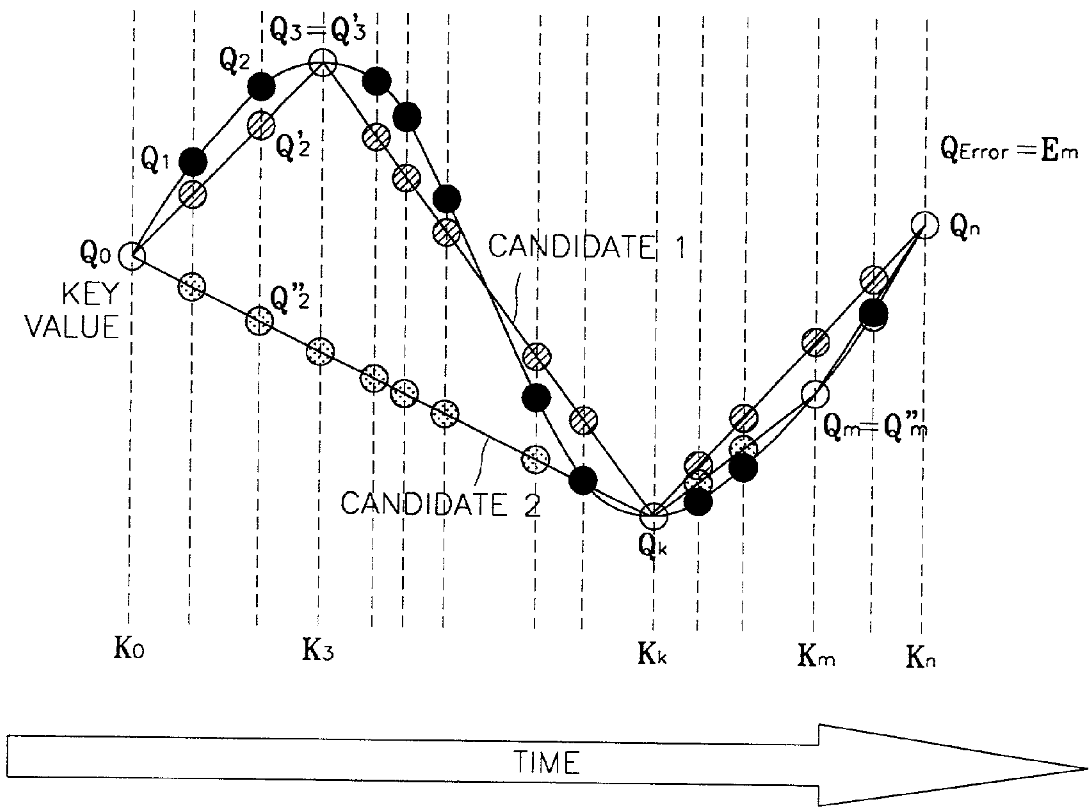
Figure 14F:
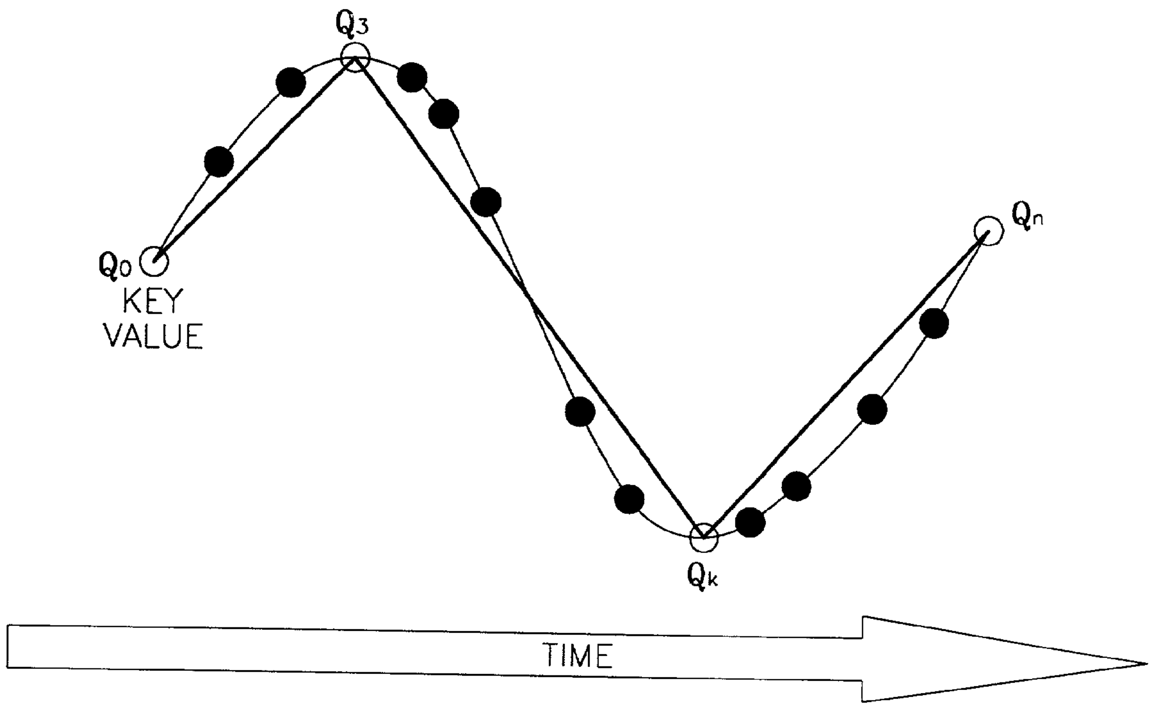

Referring to FIG. 14*e*, the fourth break point is selected by performing the process explained referring to FIGS. 14*c* and 14*d*, after selecting a candidate break point among the remaining break points excluding the three selected break points of FIG. 14*d*. For example, FIG. 14*f* shows that candidate 1 is selected. By repeating the break point selection process of FIG. 14*e* until an average error is less than an allowable error, break points, the number of which is the same as or less than the number of break points of the original path, are selected.

The average error $E_m$, which is mentioned above, will now be explained.

A quantization error is defined as a differential rotation angle in a differential rotation transformation, which is the difference between the rotation transformation of the original animation path and that of a reconstructed animation path. That is, assuming that $(\vec{r}, \theta)$ denotes a key value of an orientation interpolator node and $(\vec{r}', \theta')$ denotes a key value reconstructed in the reconstruction unit 96 (vector $\vec{r}$ denotes a rotation axis, θ denotes a rotation amount, and the rotation amount satisfies $\theta \in [-\pi, \pi]$), when rotation transformation from an arbitrary position $\vec{x}$ to $\vec{y}$ and $\vec{y}'$ in a 3D space by $(\vec{r}, \theta)$ and $(\vec{r}', \theta')$ is performed, a quantization error occurring is calculated as the difference between $\vec{y}$ and $\vec{y}'$. Thus, if $\vec{e}(\vec{x})$ represents a quantization error vector, $\vec{e}(\vec{x}) = \vec{y} - \vec{y}'$. In quaternion expression, X, Y, and Y' are defined as the following equations 4:

$$\begin{cases} X = (0, \vec{x}) \\ Y = (0, \vec{y}) \\ Y' = (0, \vec{y}') \end{cases} \quad (4)$$

If Q and Q' denote quaternion expressions of $(\vec{r}, \theta)$ and $(\vec{r}', \theta')$, respectively, which represent the rotation transformation, the following equations 5 are derived:

$$Y = Q^*X^*Q^*$$

$$X = Q^{**}Y^*Q \quad (5)$$

Here, A*B indicates quaternion multiplication of A and B and A* denotes A's conjugate. Therefore, the following equation 6 is derived:

$$Y'=Q'*X*Q'*=Q'*Q**Y*Q*Q'*=Q''*Y*Q''* \quad (6)$$

Here, Q" is a value for indicating the rotational transformation relation between $\vec{y}$ and $\vec{y}'$, and is defined by the following equation 7:

$$Q''=Q'*Q* \quad (7)$$

Therefore, if θ" denotes a differential rotation angle between $\vec{y}$ and $\vec{y}'$, θ" can be obtained using a quaternion conversion equation and equation 7 as shown in the following equation 8:

$$\theta''=2\cos^{-1}q_0''=2\cos^{-1}(Q'\cdot Q),\ \theta''\epsilon[0,\pi],\ q_0''=Q'\cdot Q, \quad (8)$$

(· indicates inner product operation)

Equation 8 indicates an instantaneous quantization error occuring at a predetermined time among all animation break points. In order to derive an equation for obtaining a quantization error of all animation intervals, an instantaneous quantization error at a predetermined time t can be expressed as the following equation 9:

$$e(t)\ 2\arccos(Q(t)\cdot Q'(t)) \quad (9)$$

If equation 9 is applied to all break point intervals of the animation by the orientation interpolators, average error $E_m$ and maximum error $E_p$ for the entire interval $[t_0, t_L]$ can be derived as the following equations 10:

$$\begin{cases} E_m = \sqrt{\dfrac{1}{t_L - t_0}\int_0^L e^2(t)\,dt} \\ E_p = \max|e(t)| \end{cases} \quad (10)$$

Here, partial sum $E'_m$ is first obtained for interval $[t_{i-1}, t_i]$ in order to obtain $E_m$, using the following equation 11:

$$E_m^i = \int_{i-1}^{i} e^2(t)\,dt = 4\int_{i-1}^{i}\arccos^2(Q(t)\cdot Q'(t))\,dt \quad (11)$$

Meanwhile, the following equation 12 is also derived:

$$4\arccos^2(Q(t)\cdot Q'(t))=\phi^2(\alpha),\ t=t_{i-1}+\alpha(t_i-t_{i-1}) \quad (12)$$

Therefore, the following equation 13 is derived:

$$E_m^i = (t_i - t_{i-1})\int_0^1 \phi^2(\alpha)\,d\alpha \quad (13)$$

Because it is difficult to obtain the definite integral of function $\phi^2(\alpha)$ between 0 and 1, approximation is performed as shown in the following equations 14:

$$\phi(\alpha)\cong\phi(0)+\alpha(\phi(1)-\phi(0))$$

$$\phi^2(\alpha)\cong\phi^2(0)+\alpha^2(\phi(1)-\phi(0))^2+2\alpha\phi(0)(\phi(1)-\phi(0)) \quad (14)$$

Here, $$\cos\frac{\phi(0)}{2} = Q(t_{i-1})\cdot Q'(t_{i-1}),\ \cos\frac{\phi(1)}{2} = Q(t_i)\cdot Q'(t_i). \quad (15)$$

Using the approximated function 14, partial sum $E_m^{\,i}$ is be obtained as the following equation 16:

$$E_m^i \cong \frac{1}{3}(t_i - t_{i-1})(\phi^2(0) + \phi^2(1) + \phi(0)\phi(1)) \quad (16)$$

These equations can be rearranged as the following equation 17:

$$E_m^i \cong \frac{4}{3}(t_i - t_{i-1})(\arccos^2(Q(t_{i-1})\cdot Q'(t_{i-1})) + \arccos^2(Q(t_i)\cdot Q'(t_i)) + \arccos(Q(t_{i-1})\cdot Q'(t_{i-1}))\arccos(Q(t_i)\cdot Q'(t_i))) \quad (17)$$

Partial sum $E_m^{\,i}$ is summed over the entire interval $[t_O, t_L]$ to obtain the average error $E_m$ as shown in the following equation 18:

$$E_m \cong \sqrt{\frac{1}{t_L - t_0}\sum_{i=0}^{L} E_m^i} \quad (18)$$

To obtain maximum error $E_p$, a maximum value is selected from among the values of the maximum error $E_p^{\,i}$ in each interval $[t_{i-1}, t_i]$, which is obtained by the following equation 19:

$$E_p^i\cong\max|e(t)|=\max 2|\arccos(Q(t)\cdot Q'(t))| \quad (19)$$

Using the approximation function described above, $E_p^{\,i}$ can be approximated as shown in the following equation 20:

$$E_p^i\cong\max(\phi(0),\phi(1))=\max\{2|\arccos(Q(t_{i-1})\cdot Q'(t_{i-1}))|,\ 2|\arccos(Q(t_i)\cdot Q'(t_i))|\} \quad (20)$$

Maximum error $E_p$ in the entire interval $[t_O, t_L]$ is expressed by the following equation 21:

$$E_p\cong\max E_p^i,\ \text{for } i=1,2,\ldots,L \quad (21)$$

The interpolator analysis unit 80 shown in FIG. 6 sends information 114 on the number of keys, the minimum value and maximum value of normalized key values, the resolutions of key and key value , and a key flag, to the entropy encoder 86. At this time, the interpolator analysis unit 80 sends keys 110 to the key coder 82, and sends information on key values, including the minimum value and maximum value of normalized key values to the key value coder 84.

Coding keys and key values in the key coder 82 and key value coder 84 will now be explained. Keys and key values are DPCM quantization method compressed in the key coder 82 and the key value coder 84, respectively. Quantized information together with other information is sent to the entropy encoder 86, and output as a bit stream finally compression encoded through the output terminal OUT3. For example, the DPCM quantizer 104 of the key coder 82 DPCM quantization codes (that is, codes the difference between the current value and the immediatley previous value) a key sent from the interpolator analysis unit 80, and outputs the coded result to the entropy encoder 86. At this time, the DPCM quantizer 106 of the key value coder 84 DPCM quantization codes (that is, codes the difference between the current value and the immediatley previous value) key values, and the minimum value and maximum value of the key values, which are sent by the interpolator analysis unit 80, and outputs the coded result to the entropy encoder 86.

Figure 10:
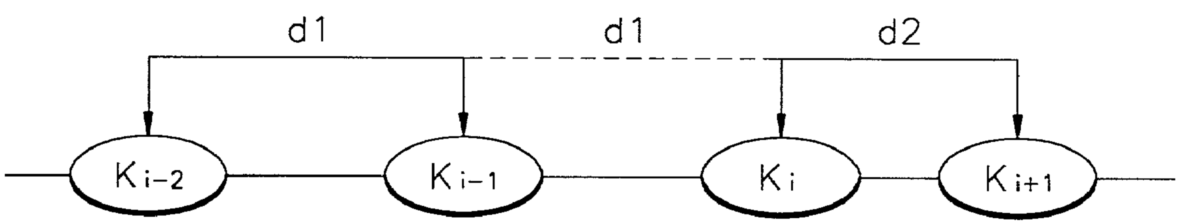
FIG. 10 is a diagram of a quantization process, and more particularly, of a Differential Pulse Code Modulation (DPCM) coding method which is generally used.

FIG. 10 is a diagram of a quantization process and shows the DPCM method which is generally used. Referring to FIG. 10, in case of key (k), a final error (e) is quantization compressed as the following equation 22. FIG. 10 explains equation 22. That is, the difference (d1) between an immediately previous value ($K_{i-1}$) and the previous value ($K_{i-2}$) thereof is obtained. The difference value (d1) is added to the immediately previous value ($K_{i-1}$) to generate an approximated value ($\hat{K}_i$). Then, the final error (e) is obtained as the difference between the approximated value ($\hat{K}_i$) and the current value ($K_i$). Meanwhile, the error (e) may be simply obtained as the difference between the current value ($K_i$) and the immediately previous value ($K_{i-1}$).

$$K_i=0, \text{ for } i<0$$

$$d\mathbf{1}=K_{i-1}-K_{i-2},$$

$$\hat{K}_i=K_{i-1}+d\mathbf{1},$$

$$d\mathbf{2}=K_i-\hat{K}_i,$$

$$e=d\mathbf{2} \qquad (22)$$

Figure 11A:
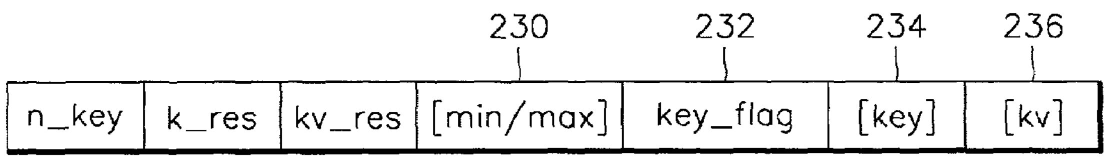
FIGS. 11*a* through 11*e* are diagrams for showing formats of coded bit streams according to the present invention.
Figure 11B:
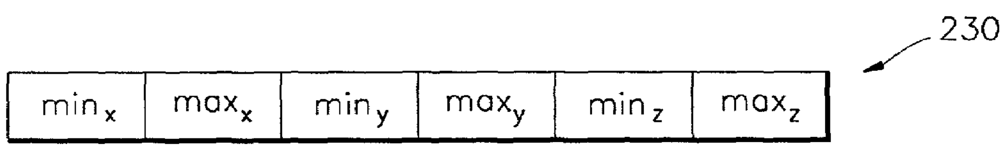
Figure 11C:
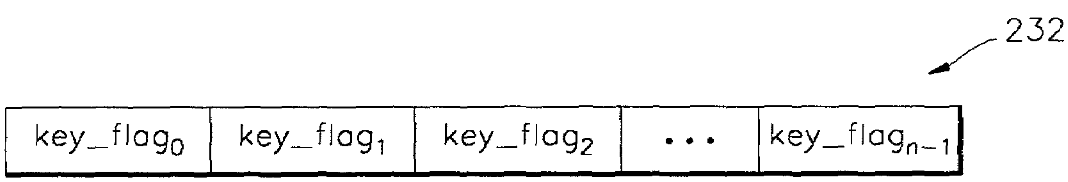
Figure 11D:
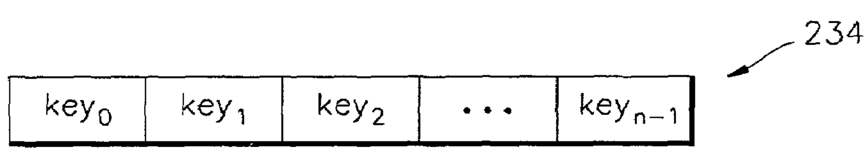
Figure 11E:
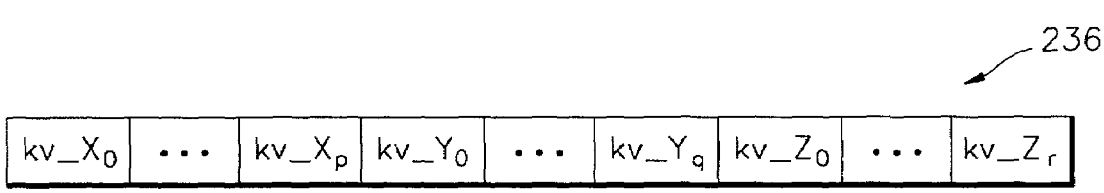
Figure 13A:
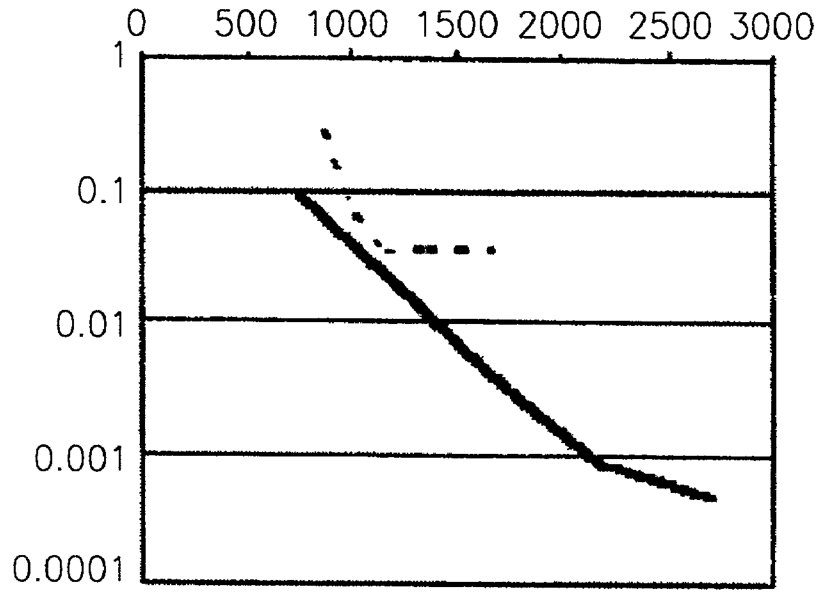
FIGS. 13*a* through 13*d* are graphs of experimental animation sequences for comparing the compression method of the present invention with the prior art compression method.
Figure 13B:
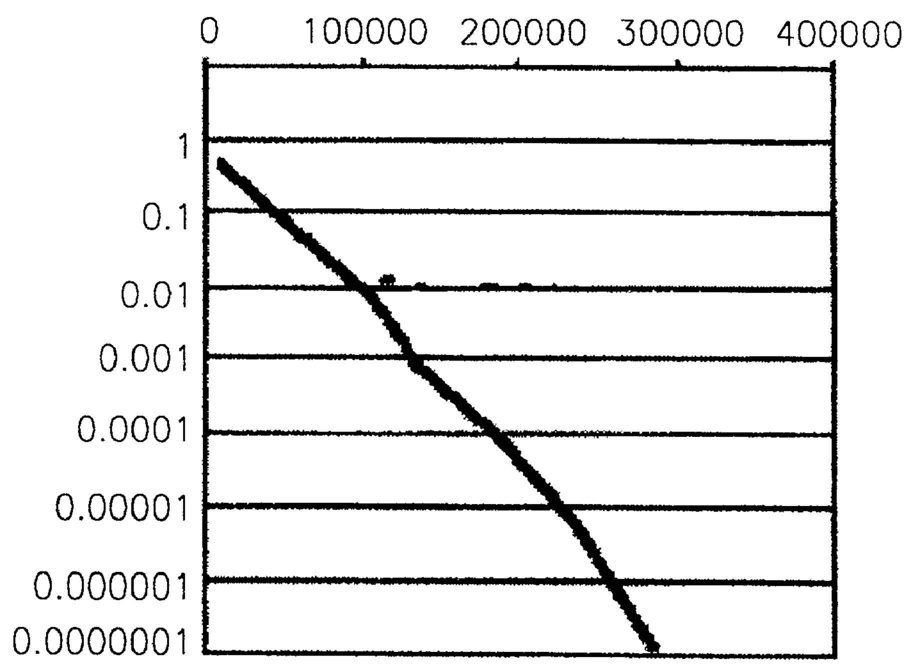
Figure 13C:
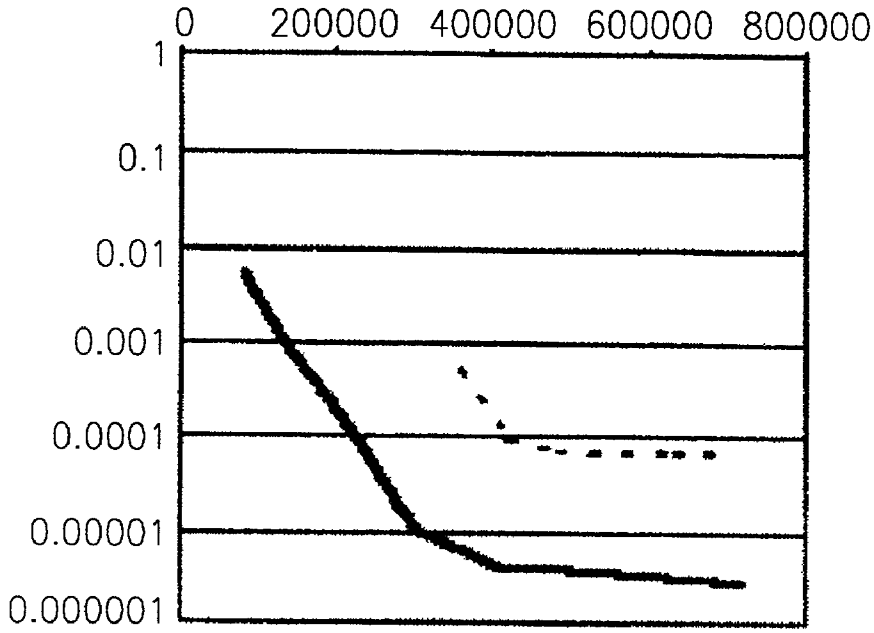
Figure 13D:
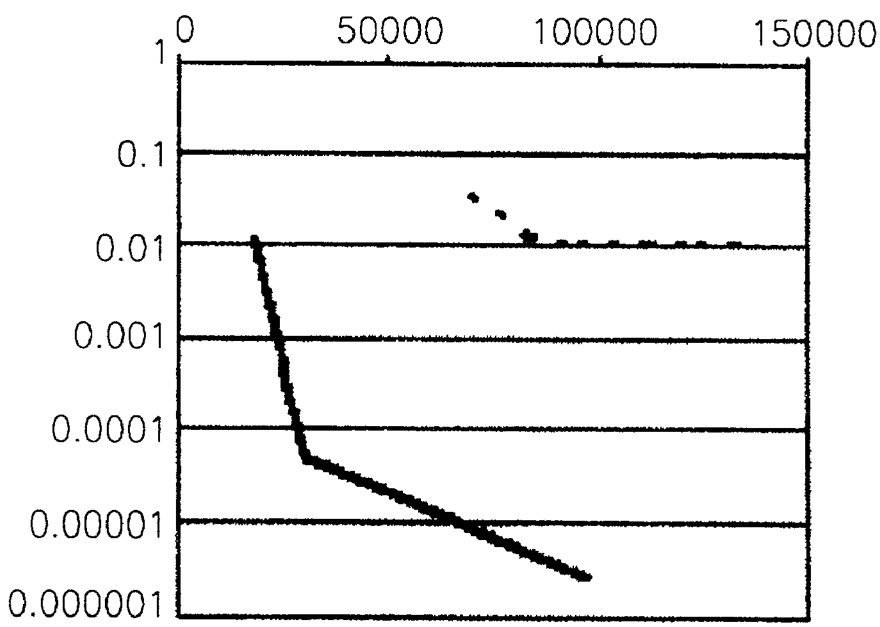

FIGS. 11*a* through 11*e* are diagrams for showing formats of coded bit streams according to the present invention. FIG. 11*a* shows the format of a coded bit stream according to the present invention, which includes the number of keys (n_key), the resolution of keys (k_res), the resolution of key values (kv_res), the minimum value and maximum value of key values array ([min/max]) 230, a key flag array ([key_flag]) 232, a key array ([key]) 234, and a key values array ([kv]) 236. Here, [ ] denotes an array. FIG. 11*b* shows the format of the minimum value and maximum value of key values array 230 of FIG. 11*a*, FIG. 11*c* shows the format of the key flag array 232, FIG. 11*d* shows the format of the key array 234, and FIG. 11*e* shows the format of key values array 236.

The minimum value and maximum value of key values array 230 of FIG. 11*a* are formed of the minimum values of X, Y. and Z axes ($min_x$, $min_y$, and $min_z$) and the maximum values of X, Y, and Z axes ($max_x$, $max_y$, $max_z$), as shown in FIG. 11*b*. The key flag array 232 is formed of n key flags ($key\_flag_0$, $key\_flag_1$, $key\_flag_2$, $key\_flag_3$, . . . , $key\_flag_{n-1}$). Here, n denotes the number of keys. The key array 234 is formed of n keys ($key_0$, $key_1$, $key_2$, . . . , $key_{n-1}$). Here, data of keys and key flags for breakpoints which are classified as unnecessary ones, for example, breakpoints P1, P3 and P6 of Table 2, may be excluded from the key array or the key flag array. Thus, the key array and/or the key flag array may consist of data less than the number (n) of the original keys. The key values array 236 is formed of p first key values ($kv\_X_0$, $kv\_X_1$, . . . , $kv\_X_{p-1}$), q second key values ($kv\_Y_0$, $kv\_Y_1$, . . . , $kv\_Y_{q-1}$), and r third key values ($kv\_Z_0$, $kv\_Z_1$, . . . , $kv\_Z_{r-1}$). Here, $p \leqq n$, $q \leqq n$, and $r \leqq n$.

Meanwhile, the apparatus and method for reconstructing an animation path according to the present invention is performed as the inverse of the compression process. The entropy decoder 90 of FIG. 7 receives an encoded bit stream through the input terminal IN4, entropy decodes the bit stream, and outputs the entropy decoded result to both the key decoder 92 and the key value decoder 94. The key decoder 92 and the key value decoder 94 receive quantized keys and key values, respectively, which are the result of entropy decoding, and, using additional information such as the key flag, reconstruct the data before quantization. That is, the key decoder 92 receives the entropy decoded result, and decodes the keys, and the key value decoder 94 receives the entropy decoded result, and decodes the key values. For this, the key decoder 92 may be implemented as the DPCM dequantizer 126, and the key value decoder 94 may be implemented as the DPCM dequantizer 128. Each DPCM dequantizer 126 or 128 decodes the input data which is decoded in the entropy decoder 90 by DPCM dequantization method.

The interpolator reconstruction unit 96 receives the data decoded in the key decoder 92 and the key value decoder 94, and reconstructs the original animation path. The interpolator reconstruction unit 96 receives information 124 on the number of keys, the minimum value and maximum value of normalized key values, the resolutions of keys and key values, and key flags, from the entropy decoder 90, keys 120 from the key decoder 92, and information 122 on key values and the minimum value and maximum value of normalized key values from the key value decoder 94. The interpolator reconstruction unit 94 reconstructs empty key values by linear interpolation, using input information. For example, in table 2, the key value of the X axis on break point P2 can be reconstructed by linear interpolation, using key values of P0 and P4. For this, the interpolator reconstruction unit 96 may be implemented as a key & key value reconstruction unit 95. The reconstructed animation path in the form of (key, key values) is output through the output terminal OUT4.

FIG. 12 is a table for explaining a decoding process expressed in a program language according to the present invention. The table is also referred to as a bit stream syntax.

Referring to the attached drawings, the method for compressing an animation path using linear approximation according to the present invention will now be compared with the prior art method for interpolator compression using the MPEG-4 BIFS.

FIGS. 13*a* through 13*d* are graphs of experimental animation sequences for comparing the compression method of the present invention with the prior art compression method. The vertical axis represents distortion degrees, the horizontal axis represents the number of bits, the method for compressing an animation path according to the present invention is marked by thick lines, and the prior art compression method is marked by dotted lines. FIGS. 13*a* through 13*d* show the results of simulations, in each of which a different animation path is applied. The method of the present invention shows increasingly better results in order of FIGS. 13*b*–13*a*–13*d*–13*c*. At the same bit rates, the compression method of the present invention showed much better picture quality than the prior art BIFS method, while at the same picture quality, the compression method of the present invention showed much better compression rate.

As described above, an interpolator expression of an animation path is used for simplification of the path using break points. However, in the prior art method, the interval between each key is uniformly formed in the expression of the path, and therefore, break points are oversampled. However, in the present invention, by analyzing break points, a simplified encoded bit stream having a minimum number of break points is obtained. The DPCM compression maintains higher linear correlation between break points, and therefore efficient compression using the higher correlation is enabled.

What is claimed is:

1. An apparatus for compressing an animation path, comprising:

an interpolator analysis unit for extracting a number of break points from an animation path and outputting keys and key values corresponding to the break points;

a key coder for coding keys output from the interpolator analysis unit;

a key value coder for coding key values output from the interpolator analysis unit, said key values being coded separately from said keys; and an entropy encoder for entropy encoding the keys and key values which are coded in the key coder and key value coder, respectively, and outputting encoded bit streams.

2. The apparatus of claim 1, wherein the interpolator analysis unit determines the number of break points so that the difference between an approximated animation path, which is obtained by the predetermined number of break points extracted among the break points of the original animation path, and the original animation path is minimized.

3. The apparatus of claim 1, wherein the key coder codes the keys output from the interpolator analysis unit by Differential Pulse Code Modulation (DPCM) quantization method.

4. The apparatus of claim 3, wherein the DPCM quantization is coding the difference between a current value and the immediate previous value, or is coding the difference between a current value and an approximated value which is obtained by adding the immediately previous value to the difference between the immediately previous value and the previous value thereof.

5. The apparatus of claim 1, wherein the key value coder codes the key values output from the interpolator analysis unit by DPCM quantization method.

6. The apparatus of claim 5, wherein the DPCM quantization is coding the difference between a current value and the immediate previous value, or is coding the difference between a current value and an approximated value which is obtained by adding the immediately previous value to the difference between the immediately previous value and the previous value thereof.

7. The apparatus of claim 1, wherein taking both end points of the original animation path as starting points, the interpolator analysis unit finds break points representing an approximated path which has the smallest difference from the original animation path, among break points, and this process is repeated until an approximated animation path is close to the original path.

8. The apparatus of claim 5, wherein break points are determined so that the area difference between the original animation path and an approximated animation path is the smallest.

9. An apparatus for reconstructing an animation path, comprising:

an entropy decoder for receiving an encoded bit stream and entropy decoding the bit stream;

a key decoder for receiving the entropy decoded result and decoding keys;

a key value decoder for receiving the entropy decoded result and decoding key values, said key values being decoded separately from said keys; and an interpolator reconstruction unit for obtaining empty key values by linear interpolation based on the keys and key values decoded in the key decoder and the key value decoder, respectively, and reconstructing the original animation path.

10. The apparatus of claim 9, wherein the key decoder decodes the entropy decoded result which is input from the entropy decoder by DPCM dequantization method.

11. The apparatus of claim 9, wherein the key value decoder decodes the entropy decoded result which is input from the entropy decoder by DPCM dequantization method.

12. A method for compressing an animation path comprising the steps of:

extracting a number of break points from an original animation path;

extracting keys and key values using the extracted break points;

coding the keys and key values separately from the key values; and entropy encoding the coded keys and key values to obtain encoded bit streams.

13. A method for reconstructing an animation path comprising the steps of:

receiving and entropy decoding an encoded bit stream;

decoding keys and separately decoding key values from the result of entropy decoding; and reconstructing an original animation path by obtaining empty key values by linear interpolation based on the decoded keys and key values.

14. A data format of a bit stream which is obtained by encoding an animation path, the data format comprising:

an array-type key flag for indicating key values of which axes are selected among key values corresponding to an x, y, or z coordinate of each break point of the animation path;

an array-type key for indicating that at least one or more key values are selected among key values corresponding to an x, y, or z coordinate of each break point; and array-type key values for indicating key values selected for each break point.

15. The data format of claim 14, further comprising:

minimum values of key values corresponding to X, Y, and Z coordinate axes; and maximum values of key values corresponding to X, Y, and Z coordinate axes.

16. The data format of claim 14, wherein the array-type key flag includes M data and M is equal to or less than the number of original keys.

17. The data format of claim 14, wherein the array-type key includes M data and M is equal to or less than the number of original keys.

18. The data format of claim 14, wherein the key values include p (=n) first key values corresponding to the x axis, q (=n) second key values corresponding to the y axis, and r (=n) third key values corresponding to the z axis and n denotes the number of keys.

19. A method for extracting break points of an animation path comprising the steps of:

(a) selecting two break points on opposite end points of the original animation path, among break points on the animation path;

(b) selecting one break point among the remaining break points excluding the two selected end point break points;

(c) interpolating for key values of the remaining break points excluding the selected break points, using the selected break points;

(d) forming an approximated path based on the selected break points and the interpolated key values, selecting an approximated animation path which has the smallest path difference between the original animation path and the approximated animation path, and selecting break points corresponding to the selected animation path; and (e) selecting one break point among remaining break points excluding the break points selected in steps (a) and (b), and repeating steps (c) to (e) until the path difference is less than an allowable difference.

20. The method of claim 19, wherein the path difference is expressed by the sum of areas of trapezoids or twisted trapezoids which are formed by the original animation path and the approximated animation path.

21. The method of claim 19, wherein in an orientation interpolator, the path difference is defined a differential rotation angle in a differential rotation transformation, which is the difference between a rotation transformation of the original animation path and a rotation transformation of the approximated path.

* * * * *